Figure 1:
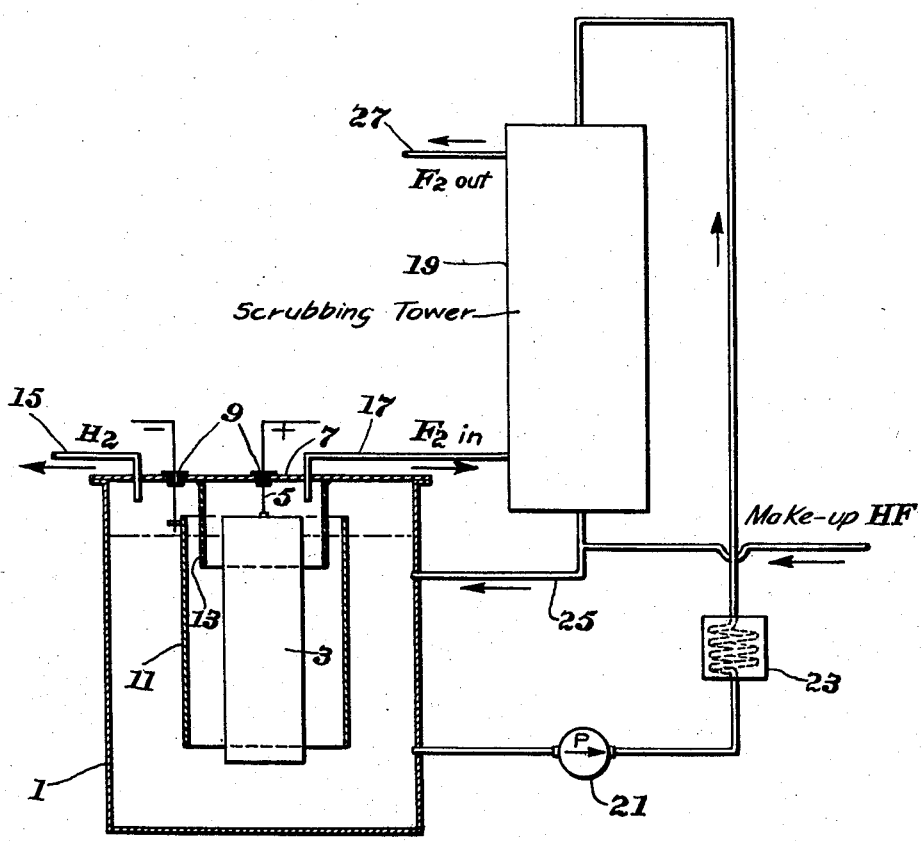

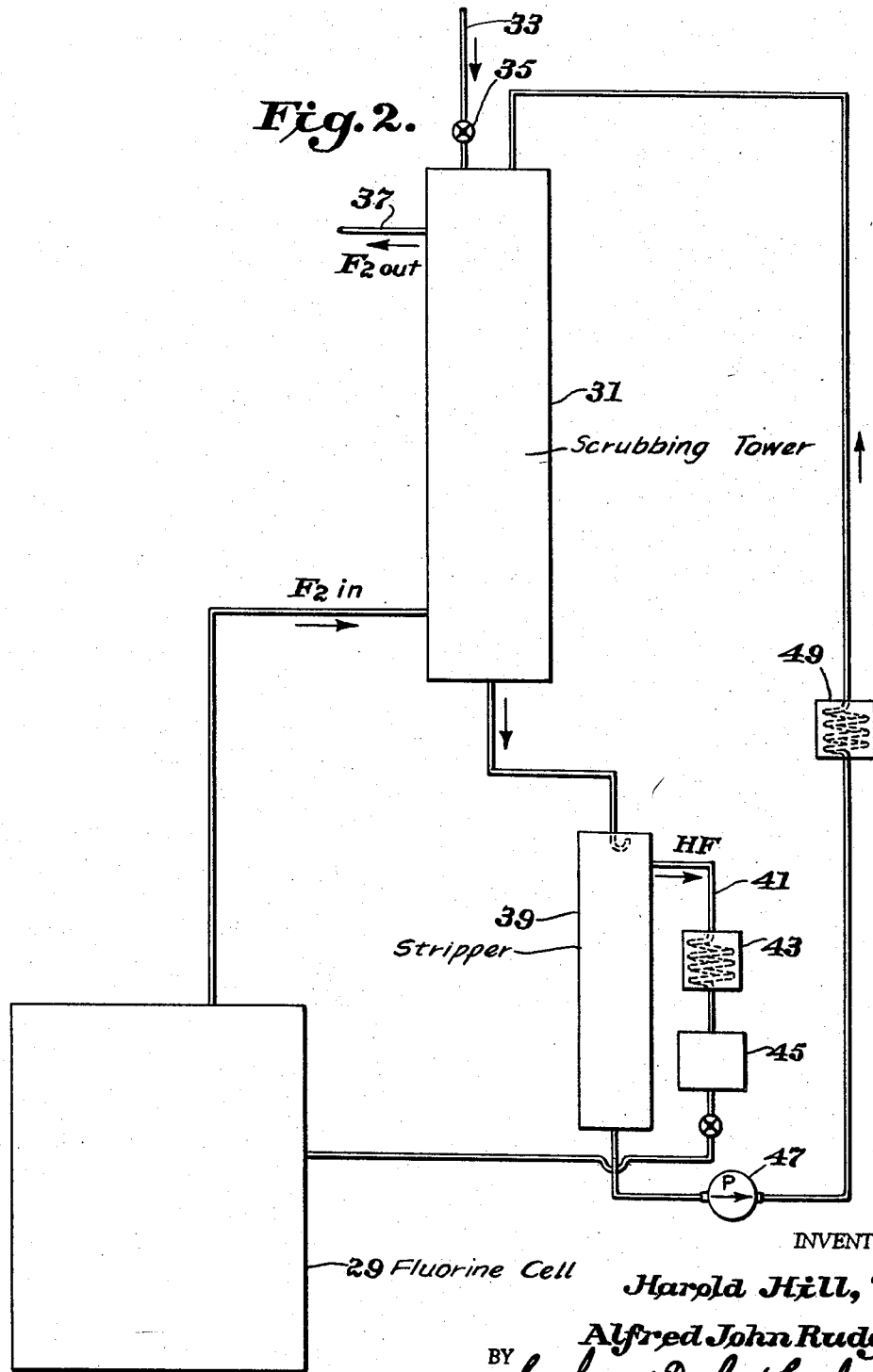

2,879,212
ELECTROLYTIC FLUORINE MANUFACTURE

Harold Hill, Runcorn, and Alfred John Rudge, Widnes, England, assignors to Imperial Chemical Industries Limited, London, England, a corporation of Great Britain Application December 19, 1955, Serial No. 553,705

Claims priority, application Great Britain December 24, 1954

6 Claims. (Cl. 204—60)

This invention relates to an improved step in a process for the manufacture of fluorine wherein the hydrogen fluoride impurity in the fluorine is removed.

It is known that fluorine produced by the electrolysis of liquid mixtures of certain alkali metal fluorides and hydrogen fluoride is contaminated with hydrogen fluoride. The concentration of hydrogen fluoride contaminant in the fluorine depends on various factors including the concentration of hydrogen fluoride in the electrolyte and the electrolyte temperature. We also find that as the anodic current density increases the proportion of hydrogen fluoride in the fluorine increases. The extent of this increase in hydrogen fluoride proportion depends on the design of the cell, on the degree of electrolyte circulation and on the temperature in the anode compartment and particularly the temperature at the anode interface which is considerably in excess of that of the bulk of the electrolyte outside the anode zone. The concentration of hydrogen fluoride in the fluorine can thus reach such proportions that its recovery becomes either essential or at least desirable.

The hydrogen fluoride contaminant may be removed from the impure fluorine by absorption in anhydrous sodium fluoride and if desired may be recovered by heating the spent absorbent. Such a procedure is, however, cumbersome particularly where large outputs of fluorine are concerned. Again part of the hydrogen fluoride content of the fluorine may be recovered by refrigeration, but recovery of an appreciable proportion of the hydrogen fluoride by this method would call for the use of very low temperatures and this can involve considerable expense.

According to the present invention an improved step in a process for the manufacture of fluorine by the electrolysis of a molten mixture of potassium fluoride and hydrogen fluoride in an electrolytic cell wherein hydrogen fluoride in the evolved fluorine is removed comprises scrubbing the fluorine contaminated with hydrogen fluoride with a molten mixture of potassium fluoride and hydrogen fluoride which is of such a hydrogen fluoride content and at such a temperature that the partial pressure of hydrogen fluoride over the scrubbing mixture of potassium fluoride and hydrogen fluoride is less than the partial pressure of hydrogen fluoride in the evolved fluorine and subsequently either returning the said scrubbing mixture after contact with the contaminated fluorine to the cell isolating hydrogen fluoride from the said scrubbing mixture and returning the said hydrogen fluoride to the cell.

Various methods may be devised to carry out the invention whereby the hydrogen fluoride content of the fluorine is considerably reduced. Thus in one method the evolved fluorine could be scrubbed with molten electrolyte withdrawn from a number of cells in each case from a region remote from the anode. Thus with a fluorine cell of well known type comprising a diaphragm or barrier situated between cathode and anode thereby forming cathode and anode compartments the electrolyte may suitably be withdrawn from a region between cathode and cell wall. This electrolyte is at a lower temperature than that existing in the anode compartment and so the partial pressure of hydrogen fluoride over this electrolyte being less than that of the hydrogen fluoride in the fluorine withdrawn from the anode compartment the electrolyte is capable of absorbing hydrogen fluoride from the evolved fluorine. If desired, the electrolyte so withdrawn may be first cooled to a temperature below that of the electrolyte in any portion of the cell. In fact the temperature of the scrubbing mixture may be reduced to a value nearer to its freezing point than would be practicable to use in any portion of a fluorine cell, the partial pressure of hydrogen fluoride of such a cooled molten mixture being thereby further reduced and permitting better absorption of hydrogen fluoride from the evolved fluorine. After contact with the contaminated fluorine the electrolyte to which additional hydrogen fluoride is added to make up that which is consumed in the cell is returned to the cell. Again the contaminated fluorine withdrawn from the anode zone could be passed through molten electrolyte contained in a separate compartment which communicates with the main body of the electrolytic cell at a point remote from the anode, the scrubbing electrolyte being thereby at a lower temperature than that in the anode zone and having a lower partial pressure of hydrogen fluoride than that of the hydrogen fluoride contaminant in the fluorine; the electrolyte used to scrub the fluorine is circulated to the main body of the cell.

Again a convenient method of carrying out the invention which does not call for return of electrolyte to the cells and which may be carried out in a continuous manner comprises scrubbing the evolved fluorine with a molten mixture of potassium fluoride and hydrogen fluoride of composition and temperature approximately corresponding to that present in the cell outside the anode compartment; alternatively the fluorine may be scrubbed with a molten mixture of potassium fluoride and hydrogen fluoride which has a lower HF concentration than that employed in the cell and whose temperature is reduced to a value lower than that of the electrolyte in any portion of the cell. As aforesaid the temperature of the scrubbing mixture may be reduced to a value nearer its freezing point than would be practicable to use in any portion of a fluorine cell. Thus with reduced HF content and reduced temperature the result is that the partial pressure of HF over such a molten mixture is reduced to a value much below that over electrolyte drawn even from outside the anode compartment and said mixture permits particularly good absorption of hydrogen fluoride from the evolved fluorine. Subsequent to either of the above scrubbing procedures the scrubbed fluorine is withdrawn and the molten scrubbing mixture after contact with the evolved fluorine is passed to a stripper heated to such a temperature as would correspond to slightly above 760 mm. Hg partial pressure of hydrogen fluoride over said scrubbing mixture. The excess of hydrogen fluoride which boils off may if desired be condensed at the approximate boiling point of HF at 760 mm. Hg pressures, that is, about 19.4° C. and returned to the cell, the scrubbing mixture from the stripper being subsequently passed through a cooler and then back to the scrubber. For example such a method may be employed when a molten mixture of potassium fluoride and hydrogen fluoride containing 41% by weight of hydrogen fluoride is electrolysed at an anodic current density of 0.8 amps. per sq. in. at a temperature, as measured outside the anode zone, of 85° C. Under such conditions of electrolysis the evolved fluorine may contain 24.2% by volume of hydrogen fluoride corresponding to a partial pressure of 180 mm. Hg, which partial pressure is shown by electrolyte of the said 41% hydrogen fluoride content at a temperature of 130° C. This fluorine may be scrubbed with a molten mixture of potassium fluoride and hydrogen fluoride which is at a temperature of 80° C. and contains 39% by weight of hydrogen fluoride, corresponding to an HF partial pressure of 15 mm. Hg. Then, as aforesaid, the scrubbed fluorine is withdrawn and the scrubbing mixture is subsequently heated in the stripper to remove hydrogen fluoride which is condensed and passed back to the cell, the said mixture being then cooled and passed back to the scrubber.

The invention further includes within its scope fluorine cells provided with means for the scrubbing of evolved fluorine to remove the HF contaminant with a molten mixture of potassium fluoride and hydrogen fluoride as hereinbefore described and means either for returning said scrubbing mixture to the cell or for isolating hydrogen fluoride from the scrubbing mixture and returning said HF to the cell as hereinbefore described.

The apparatus utilized in connection with the invention is illustrated in Figures 1 and 2 of the drawings.

Referring to Figure 1, a fluorine cell 1 of the type shown, for example, in United States Patent No. 2,693,445, is illustrated and includes a carbon anode 3 supported by an electrically conducting rod 5 which passes through lid 7 and is insulated therefrom by insulator 9. The cell also includes cathode 11 of mild steel, copper, or other material resistant to the electrolyte and products of electrolysis, and diaphragm 13 which separates the gases evolved at the electrodes. Exits 15 and 17 are provided for the hydrogen and fluorine, respectively.

As illustrated in Figure 1, fluorine emerges from cell 1 and passes into a scrubbing tower 19. The fluorine contaminated with hydrogen fluoride is then scrubbed with a molten mixture of potassium fluoride and hydrogen fluoride obtained from cell 1 and passing through pump 21 and cooler 23. Makeup hydrogen fluoride is supplied through pipe 25 and scrubbed fluorine passes out of pipe 27.

Referring to Figure 2, a fluorine cell 29 is illustrated in blocked diagram, which corresponds to cell 1 of Figure 1. As in the apparatus of Figure 1, fluorine contaminated with hydrogen fluoride passes out of the cell and into scrubbing tower 31. An initial supply of a molten mixture of potassium fluoride and hydrogen fluoride is fed into scrubbing tower 31 through pipe 33. This supply can be cut off by valve 35.

After the process is commenced, scrubbed fluorine passes out by pipe 37 while the scrubbing mixture is passed to a stripper 39. Excess hydrogen fluoride passes through pipe 41, cooler 43 and, hence, through storage container 45 back to cell 29. The scrubbing mixture from the stripper 39 is passed through pump 47, cooler 49 and back to the scrubber 31.

What we claim is:

1. In a process for the manufacture of fluorine by the electrolysis of a molten mixture of potassium fluoride and hydrogen fluoride in an electrolytic cell wherein hydrogen fluoride in the evolved fluorine is removed, the improved method of removing said hydrogen fluoride from said evolved fluorine comprising scrubbing the fluorine contaminated with hydrogen fluoride with a molten mixture of potassium fluoride and hydrogen fluoride which is of such a hydrogen fluoride content and at such a temperature that the partial pressure of hydrogen fluoride over the scrubbing mixture of potassium fluoride and hydrogen fluoride is less than the partial pressure of hydrogen fluoride in the evolved fluorine, and subsequently returning the hydrogen fluoride in the scrubbing mixture, after contact with the contaminated fluorine, to the cell.

2. A process as claimed in claim 1 wherein hydrogen fluoride is first isolated from said scrubbing mixture, after contact with the contaminated fluorine, and then returned to the cell.

3. A process as claimed in claim 1 in which the scrubbing mixture is electrolyte withdrawn from a region in the cell remote from the anode, which scrubbing mixture is cooled to a temperature below that of the electrolyte in any portion of the cell, and in which the scrubbing mixture, after contact with the contaminated fluorine and after subsequent addition of hydrogen fluoride to make up that consumed in the cell, is returned to the cell.

4. A process as claimed in claim 1 in which the scrubbing mixture, after contact with the contaminated fluorine, is passed to a stripper heated to a temperature corresponding to slightly above 760 mm. Hg partial pressure of hydrogen fluoride over said scrubbing mixture, the hydrogen fluoride which boils off is returned to the cell and the scrubbing mixture from the stripper is subsequently cooled and passed back to the scrubber.

5. A process as claimed in claim 4 in which the scrubbing mixture is a mixture of potassium fluoride and hydrogen fluoride of composition and temperature approximately corresponding to electrolyte withdrawn from the cell from a region remote from the anode.

6. A process as claimed in claim 4 in which the HF concentration and temperature of the molten scrubbing mixture is less than that of the electrolyte in any portion of the cell.

References Cited in the file of this patent

UNITED STATES PATENTS 857,927   Dow et al. _____ June 25, 1907

OTHER REFERENCES

Priest et al.: "Industrial and Engineering Chemistry," vol. 39, March 1947, pages 279 and 280.

Fowler et al.: "Industrial and Engineering Chemistry," vol. 39 (March 1947), pages 266–271.